United States Patent
Kosugi

(10) Patent No.: US 7,729,590 B2
(45) Date of Patent: Jun. 1, 2010

(54) DIGITAL VIDEO STREAM TRICK PLAY

(75) Inventor: Takuya Kosugi, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1602 days.

(21) Appl. No.: 10/910,150

(22) Filed: Aug. 3, 2004

(65) Prior Publication Data

US 2006/0029364 A1    Feb. 9, 2006

(51) Int. Cl.
H04N 5/91    (2006.01)
H04N 7/26    (2006.01)
H04N 7/12    (2006.01)
H04N 11/02   (2006.01)
H04B 1/66    (2006.01)

(52) U.S. Cl. ............. 386/68; 386/111; 375/240.16

(58) Field of Classification Search .............. 386/68; 375/240.13

See application file for complete search history.

(56) References Cited

U.S. PATENT DOCUMENTS

| | | | |
|---|---|---|---|
| 5,799,129 A * | 8/1998 | Muto | 386/111 |
| 6,154,603 A | 11/2000 | Willis et al. | |
| 6,222,979 B1 | 4/2001 | Willis et al. | |
| 6,229,951 B1 | 5/2001 | Schultz et al. | |
| 6,658,056 B1 | 12/2003 | Duruoz et al. | |
| 6,658,199 B1 * | 12/2003 | Hallberg | 386/68 |
| 6,738,980 B2 * | 5/2004 | Lin et al. | 725/88 |
| 7,024,098 B2 * | 4/2006 | Lin et al. | 386/68 |
| 2004/0076236 A1 * | 4/2004 | Duruoz et al. | 375/240.25 |
| 2004/0196908 A1 * | 10/2004 | Lin et al. | 375/240.15 |
| 2004/0264924 A1 * | 12/2004 | Campisano et al. | 386/68 |

* cited by examiner

*Primary Examiner*—Marsha D Banks Harold
*Assistant Examiner*—Jessica Roberts
(74) *Attorney, Agent, or Firm*—Miller Patent Services; Jerry A. Miller

(57) ABSTRACT

An example trick mode play process for digital video stores a plurality of most recent reference frames in a corresponding plurality of frame buffers; displaying a current frame during a current frame time interval; determining a next frame for display; inspecting the plurality of frame buffers to determine if the next frame is present in a frame buffers. If the next frame is present, designating the frame for display in the next frame time interval. If the next frame is not present: checking if the frame buffers contain any reference frames needed to decode the next frame; and decoding a next frame using all reference frames needed to decode the next frame which can be found in the frame. This abstract is not to be considered limiting, since other embodiments may deviate from the features described in this abstract.

43 Claims, 4 Drawing Sheets

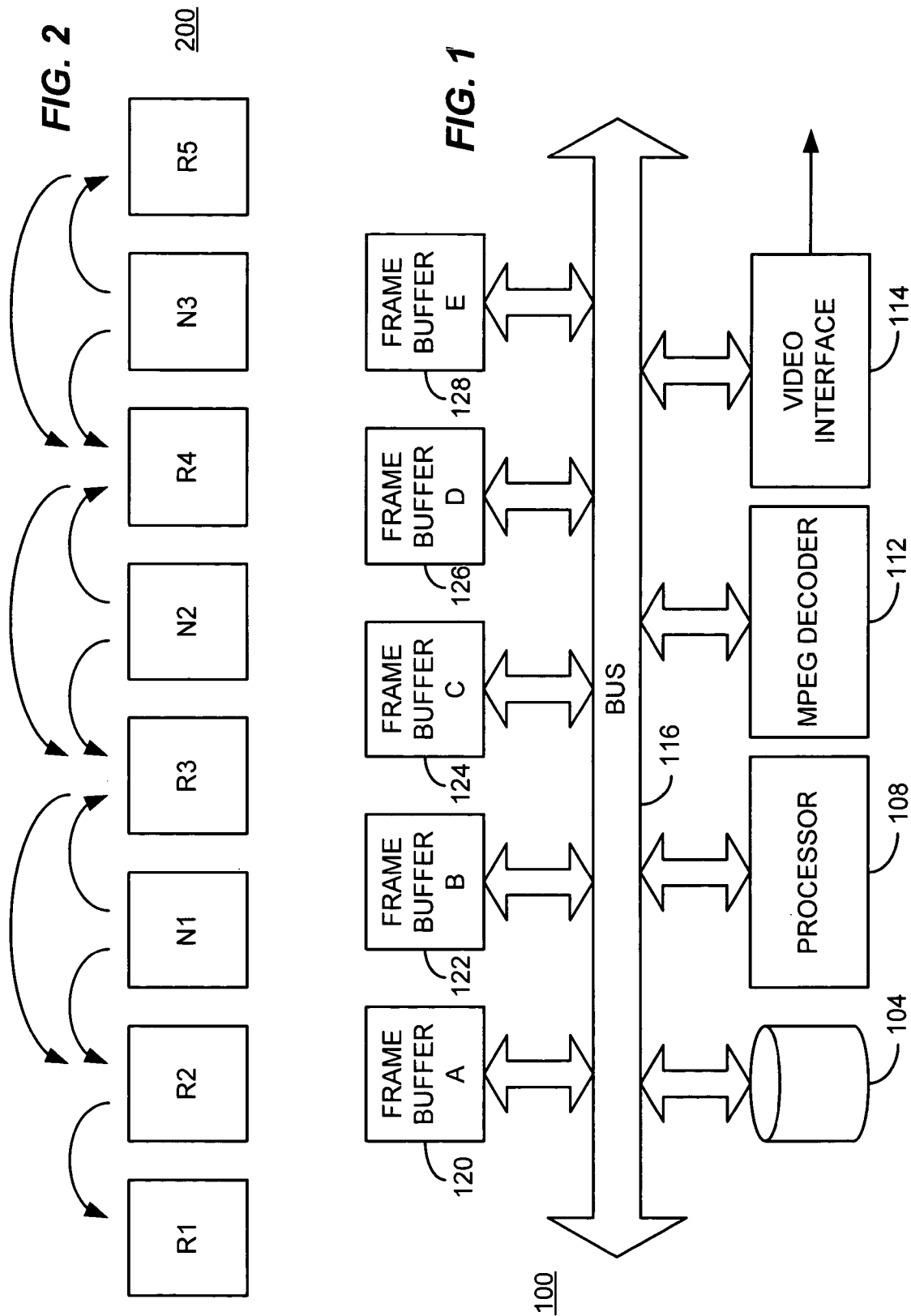

US 7,729,590 B2

DIGITAL VIDEO STREAM TRICK PLAY

BACKGROUND

Digital video encoding such as MPEG (Moving Pictures Expert Group) compliant digital video has become a popular encoding mechanism that permits digital storage, transmission and reproduction of video images such as television programs and movies. The transition from analog to digital has made PVR's (personal video recorders), also known as DVR's (digital video recorders), an increasingly popular technology. PVR's are used to store digital video content using digital technologies such as hard disc drives.

Users of such PVR devices have come to expect such devices to be capable of so-called "trick play" operation that resembles operation of video tape recorders (VTR's). Trick play operation includes, but is not limited to, fast forward, reverse, fast reverse, jump and skip functions. Most digital coding techniques such as MPEG compliant encoding utilize significant levels of compression. Such compression is implemented by use of predictive coding techniques in which certain frames of video are dependent upon and utilize information in other frames of video. For example, MPEG I frames (intra-coded frames) stand alone, while B frames and P frames (Inter-coded frames) are dependent upon and use information presented in other frames.

Such encoding techniques were designed for normal speed forward play of video. Predictive coding techniques complicate trick mode play. Most commonly, when trick play, such as reverse mode trick play, is implemented, the result is a jerky or freeze frame-like image that is sometimes implemented by only playing back I frames (which do not depend on other frames). Sometimes the I frames are repeated to fill in for missing video frames. As a result, trick play is often only a crude approximation of that which can be obtained with analog VTR technology.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 1 is a block diagram of an exemplary digital video decoder system consistent with certain embodiments of the present invention.

FIG. 2 illustrates a segment of frames representing digital video data consistent with certain embodiments of the present invention.

DETAILED DESCRIPTION

Figure 3:
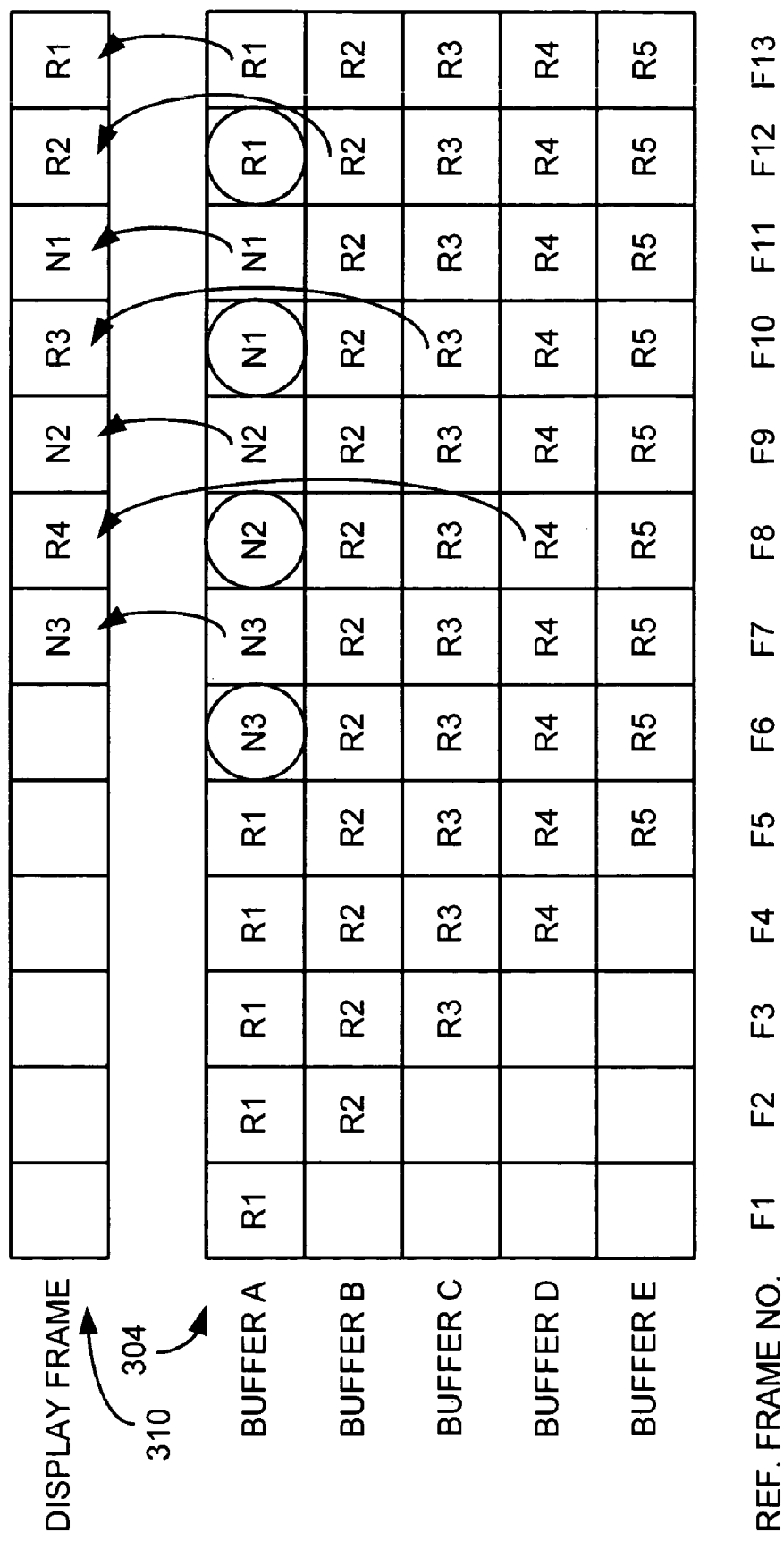
FIG. 3 illustrates movement of data through the frame buffers of FIG. 1 consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Turning now to FIG. 1, a system block diagram for a decoding arrangement is depicted as system 100. In this system, video content is stored on a storage device 104 such as a hard disc drive, and is stored and retrieved under control of processor 108. Video frames are sent to a video decoder (e.g., an MPEG decoder) 112 via bus 116. At decoder 112, the video data are decoded for display or other use through video interface 114 which provides an appropriate interface to a display device or other recipient of the video.

In order to achieve smooth playback of the video in trick modes, the present embodiment utilizes multiple frame buffers A, B, C, D and E (120, 122, 124, 126, and 128). Five such frame buffers are used in this example, but more or fewer frame buffers may be used in other embodiments, depending upon cost, size and processor constraints, etc. The video is stored in these buffers under control of processor 108 in accordance with the discussion to follow.

In order to understand the operation of the present embodiment, it is useful to consider an example video stream segment 200 as shown in FIG. 2. This stream segment 200 has eight frames of video. Two basic types of video frame are depicted—(1) reference frames (R) which are referenced by other frames (e.g., MPEG I or P frames), and (2) non-referenced frames (N) which are not referenced by other frames (e.g., MPEG B frames). In this example, frames in stream segment 200 have dependencies shown by the arrows. That is, frame R1 is not dependent on other frames; frame R2 depends upon frame R1; frame N1 references frames R2 and R3; frame R3 references frame R2; claim N2 references frames R3 and R4; frame R4 references frame R3; frame N3 references frame R4 and frame R5; and frame R5 references frame R4.

Now consider FIG. 3 which illustrates the buffer frames' content in grid 304 and the frame being displayed at 310. Each vertical column is shown as a processing time period (periods F1 through F13) which in some cases corresponds to a frame presentation time period (but in the case of F1 through F6, may be much less than one frame presentation time period, e.g., ½ or ¼ of one frame presentation time period or less). Now consider an example where reverse playback is desired starting at frame N3 of stream segment 200. In order to carry out smooth reverse trick mode, the buffers are first filled, during times F1 through F5 with the five most recent reference frames R1, R2, R3, R4 and R5. At this point the first frame to be displayed is determined to be N3 (per the above assumption). Since this frame N3 is not presently stored in any of buffers A through E, frame N3 is decoded at time F6 from R4 and R5 stored in buffers D and E, and placed in buffer A. In this case, the content of buffer A is replaced since it's previous content is the oldest and thus least likely to be needed. (The content of buffer E could alternatively have been replaced since N3 is the only frame that depends on frame R5.) The creation of this frame buffer A entry is depicted by the circle around N3 at time F6 (which may be less than one frame presentation time). At time F7, the content of frame buffer A is displayed as the display frame.

At this point, it should be considered that the frame buffers should be recycled wisely. The smaller the number of frame buffers available, the more wisely the recycling of the buffers should be to achieve smooth trick play. This will be discussed further after completion of discussion of this example.

At time F8, the next frame to be displayed is available in frame buffer D and is thus directly retrieved therefrom for display as indicated by the arrow. During time F8, the next frame needed is determined to be N2, which as previously noted depends on R3 and R4. Thus, while R4 is directly sent to display, frame N2 is calculated from R3 and R4 plus data from storage 104, and replaces N3 in buffer A. Again the circle indicates that this frame was decoded to place in buffer A.

At time F9, the frame N2, which is now available in buffer A is retrieved for display. During time F9, it is determined that the next needed frame for display will be R3. Since this frame R3 is available from frame buffer C, no decoding is needed.

At time F10, frame R3 is retrieved for display from buffer C without need for any decoding. It is determined at F10 that the next frame that will be needed is N1, therefore, N1 is decoded using R2 and R3 from buffers B and C (along with other data retrieved from storage 104).

At time F11, the frame N1, which is now available in buffer A is retrieved for display. During time F11, it is determined that the next needed frame for display will be R2. Since this frame R2 is available from frame buffer B, no decoding is needed. Looking ahead, frame R1 will be the next frame that is to be displayed. Since this frame is no longer stored in frame buffer A, the frame R1 is decoded at time F12 (again indicated by the circle around R1 in frame buffer A). At time F13, frame R1 is retrieved from frame buffer A and for display.

Note that other arrangements for recycling the frame buffers could be used. For example, in this example R1 is overwritten by N1 even though R1 will be needed in the future. But, in this case, R1 is shown to be dependent upon no other frames (i.e., an MPEG I frame). Thus, restoration of frame R1 is a simple matter of retrieving it from storage 104 when needed and no other frames need be retrieved to decode it. Thus, I frames and similar frames that are reference frames but do not depend upon additional frames to be decoded are good candidates for recycling, since the cost to restore R1 from storage is low in terms of time and computational complexity.

Let's assume that the cost of restoring R1 measured in time is one frame decoding time. On the other hand, if R3 is needed, then R2 is also needed, which means that R1 is also needed. In this case, if R3 is needed then the time cost of retrieving R3 is the time needed to decode each of R1, R2 and R3=3 frame decoding times. Thus, it may be advantageous to save R2 rather than R1.

An additional factor that is to be considered in devising the appropriate algorithm for frame buffer recycling is decoder processing power. Some decoders can decode faster than in one frame presentation time. For example, if the decoder can decode in ¼ of one frame presentation time, then the algorithm can assign the cost associated with decoding four frames as being equivalent to the cost of decoding a single frame with a decoder that can only decode one frame per presentation time. Such additional processing speed can introduce greater flexibility into the recycling algorithm.

Decoding a non-I frame (or equivalent in other predictive encoding schemes) may require multiple frame buffers, which can be considered another factor in the cost. If the budget for frame buffers can be made high enough, the weight of the frame buffer cost can be low and vice versa. If enough memory is available, an entire group of pictures (GOP) could be buffered, rendering the algorithm a simple matter of finding the frame that is needed next.

Additionally, the time required to retrieve a frame from storage in storage 104 should factor into the algorithm for determining the cost of reproducing a frame stored in the frame buffer that needs to be restored. This time varies with the size of the frame. Generally an MPEG I frame is much larger in size than B or P frames, and thus takes longer to retrieve from storage 104 if needed. So, another cost that should factor into the algorithm is the cost of reading the data from the disc drive.

Generally, the algorithm should, thus, take into consideration a preference for recycling frames with low cost to restore or unnecessary frames (cost of restoring is zero if the frame is never restored). The recycling policy depends upon decoder speed, memory budget, data read latency. In the event that an occasional frame cannot be restored in time, a default action is to repeat the previous frame, but this sacrifices smoothness of the playback. The selection of frames for decoding and displaying should be under total control of the processor 108 carrying out the algorithm.

A decoder interface consistent with certain embodiments of the invention should have some or all of the following attributes:

Flexibility to use a larger number of frame buffers than currently conventional decoders. For example, in MPEG2 video decoders, three or four frame buffers are used to perform normal forward direction decoding. The number of frame buffers used depends upon the developer's memory budget and system architecture. This allows the decoder to keep some reference frames that might be used frequently with the decoder needs to perform a reverse trick mode.

Control software should be able to select which frame buffer to use for storage of a decoded frame that is fed to the decoder. This allows the control software to manage how to build reference frames and target frames.

Control software should be able to select which frame buffer to use for forward or backward predication to decode a frame. This allows the control software to manage how to build reference frames and target frames.

Control software should be able to specify whether or not the frame should be displayed or not after decoding. This allows the control software to specify that only target frames are to be displayed.

Control software should be able to specify how long the decoded frame is displayed (e.g., n times the normal frame presentation period). This permits the control software to implement frame repeat to slow down playback. The interface can also notify the control software when the time has expired so the control software can recycle the frame buffer if desired.

If the decoder implementation requires that an application feed unnecessary frames to it for processing (frames which are not needed for display or reference) the decoder should be able to skip such frames under software control.

Decoder should preferably be able to decode at a rate faster than the frame presentation rate—the faster the better. This permits construction of reference frames or target frames on time.

Figure 4:
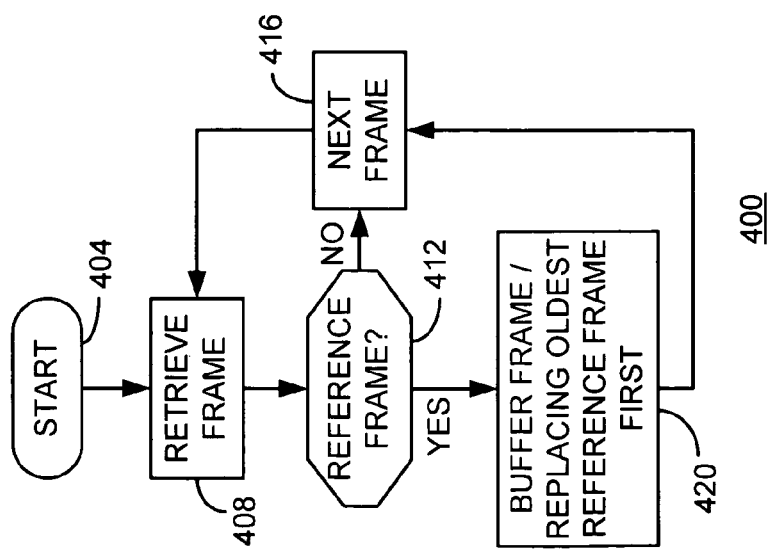
FIG. 4 is a flow chart describing an exemplary frame buffer storage process consistent with certain embodiments of the present invention.

FIG. 4 describes an exemplary process 400 starting at 404, in which reference frames such as R1 through R5, are stored in the frame buffers A through E. When a frame is retrieved at 408, if the retrieved frame is not a reference frame, control returns to 408. If at 412, the retrieved frame is a reference frame, the frame is placed in one of the frame buffers, replacing or displacing the oldest reference frame in one of the buffers. Note that the new reference frame can be placed in an open buffer or the frame buffers can operate in a first in first out (FIFO) manner.

Figure 5:
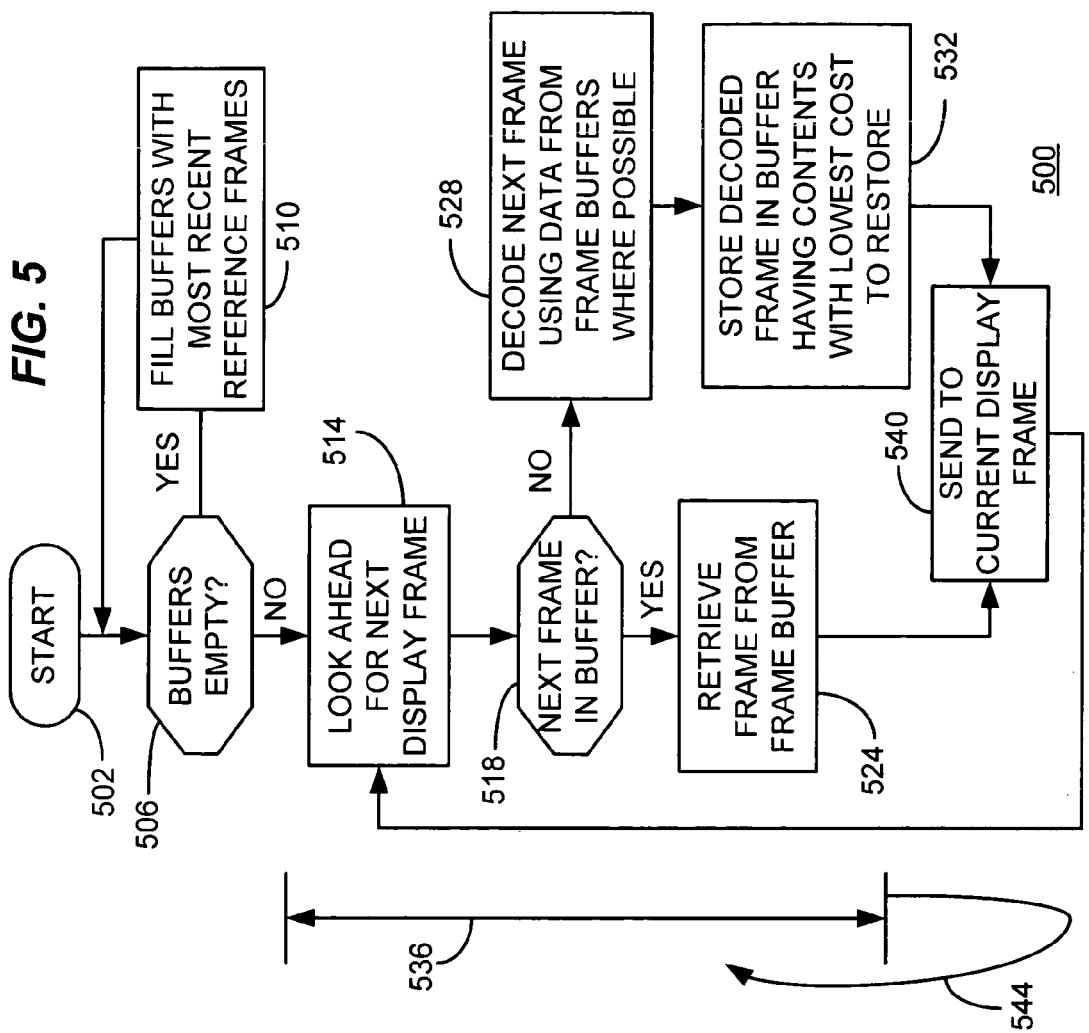
FIG. 5 is an exemplary trick mode process consistent with certain embodiments of the present invention.

FIG. 5 describes an exemplary process 500 for trick play modes that is invoked at 502. Although not shown, the process can be halted at any time by user intervention or by program control. At 506, when the trick mode (e.g. a reverse or skip trick mode) is invoked, a determination is made as to whether or not the buffers are empty (e.g., starting play with a trick mode), or alternatively and equivalently, if the buffers do not contain reference frames near the starting point of the trick play. If so, the buffers are filled with the most recent (referenced from the start point assuming a prior forward play mode) reference frames. This time, may correspond to times F1 through F5 of FIG. 3. This frame buffer filling stage should preferably be carried out as quickly as possible to create a quick response in the trick play operation. Thus, F1 through F5 may not correspond to one frame time interval, but is preferably carried out as quickly as the decoder 112 can build these frames from data in storage 104.

Once these frame buffers are filled, the first frame to be displayed is determined at 514 (this is already known for the first frame, since it is the starting frame for playback in the trick mode—in subsequent frames the next frame is determined by looking ahead). If this frame is in one of the frame buffers at 518, the frame is simply retrieved directly from the frame buffer at 524 for display. If, however, the frame is not in one of the frame buffers at 518 the next frame is decoded using data from the frame buffers where possible, and otherwise retrieving the data from storage 104 at 528. This decoded frame is then stored in the frame buffer by displacing or replacing the data with lowest replacement cost in any of the frame buffers at 532. Such cost can be determined by age of the frame, likely need, not needed to decode other frames, etc. as described above.

The functions described in 514, 518, 524, 528, and 532 are all carried out during one frame time cycle as illustrated by the indicator 536 in order to prepare for the next frame cycle that includes display of the frame just discussed at 540. While this "current" frame is displayed, the functions are repeated as indicated by the arrow 544. Thus, display of a current frame is carried out during processing of a next frame either by decoding it or retrieving it.

Thus, a trick mode play process for digital video consistent with certain embodiments involves storing a plurality of most recent reference frames in a corresponding plurality of frame buffers; displaying a current frame during a current frame time interval; determining a next frame for display; inspecting the plurality of frame buffers to determine if the next frame is present in one of the frame buffers. If the next frame is present in one of the frame buffers, designating the frame for display in the next frame time interval. If the next frame is not present in one of the frame buffers: checking if the frame buffers contain any reference frames needed to decode the next frame; and decoding a next frame using all reference frames needed to decode the next frame which can be found in the frame. In certain embodiments, the method involves replacing data in a frame buffer with the next frame, wherein the data replaced comprises data having a lowest cost of restoration. The lowest cost can be determined, for example, by data that can be restored by reading from a storage device; an oldest frame stored in any of the frame buffers; a frame that has just been used and is not referenced by another frame; data that has the lowest cost in time to restore; data that has the lowest cost in computational complexity to restore; or an intra-coded frame. Other costs can also be considered without departing from embodiments consistent with the present invention.

Figure 6:
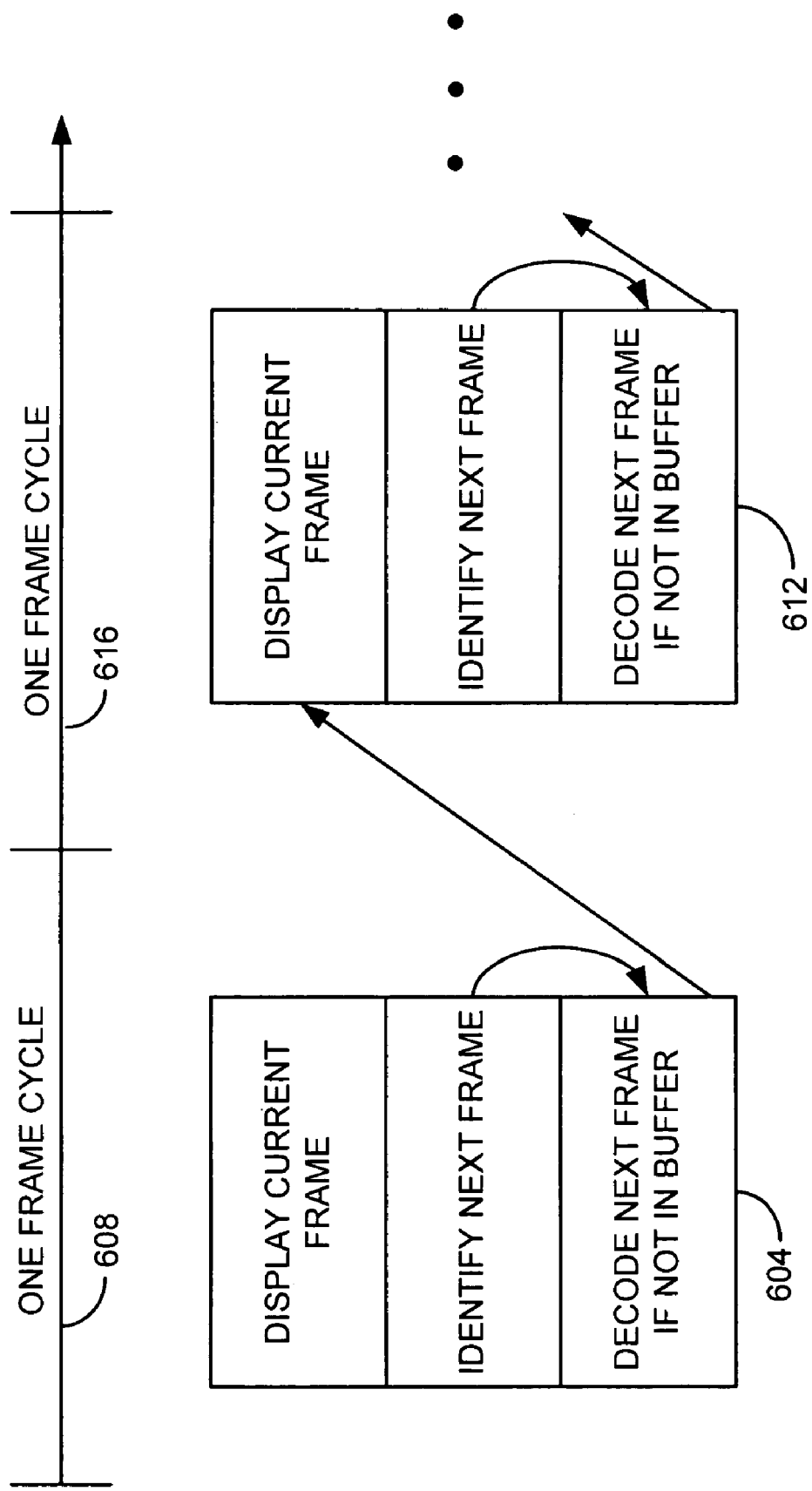
FIG. 6 illustrates the timing of an exemplary trick mode process consistent with certain embodiments of the present invention.

The above timing is further illustrated in FIG. 6, in which display of a current frame, identifying a next frame and decoding the next frame if necessary is carried out at 604 during frame cycle 608. The next frame at 604 becomes the current frame at 612 during frame cycle 616 where the process is repeated.

Those skilled in the art will recognize, upon consideration of the above teachings, that certain of the above exemplary embodiments are based upon use of a programmed processor such as 108 and possibly 112. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer, readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A trick mode play process for digital video, comprising:
   storing a plurality of most recent reference frames in a corresponding plurality of frame buffers;
   displaying a current frame during a current frame time interval;
   determining a next frame for display;
   inspecting the plurality of frame buffers to determine if the next frame is present in one of the frame buffers;
   if the next frame is present in one of the frame buffers, designating the frame for display in the next frame time interval;
   if the next frame is not present in one of the frame buffers:
      checking if the frame buffers contain any reference frames needed to decode the next frame; and
      at a decoder, decoding a next frame using all reference frames needed to decode the next frame which can be found in the frame buffers; and
   storing data comprising a next frame into one of the frame buffers by replacing said frame buffer data with data selected for replacement being based upon the replaced data having a lowest cost of restoration, where determining the lowest cost of restoration comprises at least determining that the frame requires a lowest number of additional video frames to decode.

2. The method according to claim 1, wherein the data replaced comprises data that can be restored by reading from a storage device.

3. The method according to claim 1, wherein the data replaced comprises an oldest frame stored in any of the frame buffers.

4. The method according to claim 1, wherein the data replaced comprises a frame that has just been used and is not referenced by another frame.

5. The method according to claim 1, wherein the data replaced comprises data that has the lowest cost in time to restore.

6. The method according to claim 1, wherein the data replaced comprises data that has the lowest cost in computational complexity to restore.

7. The method according to claim 1, wherein the data replaced comprises an intra-coded frame.

8. The method according to claim 1, wherein the frames stored in the frame buffers are stored during a normal play mode.

9. The method according to claim 1, wherein the frames stored in the frame buffers are stored after invoking the trick play mode.

10. The method according to claim 2, wherein the frames stored in the frame buffers are stored at a rate of greater than the frame rate.

11. The method according to claim 1, wherein the plurality of frame buffers comprises at least five frame buffers.

12. The method according to claim 1, wherein the displaying, determining, inspecting, designating, checking and decoding are carried out within the frame period for displaying the current frame.

13. A computer readable storage medium storing instructions which, when executed on a programmed processor, carry out the process according to claim 1.

14. A trick mode play process for digital video, carried out by use of a programmed processor, comprising:
   storing a plurality of most recent reference frames in a corresponding plurality of at least five frame buffers;
   displaying a current frame during a current frame time interval;
   determining a next frame for display;
   inspecting the plurality of frame buffers to determine if the next frame is present in one of the frame buffers;
   if the next frame is present in one of the frame buffers, designating the frame for display in the next frame time interval;
   if the next frame is not present in one of the frame buffers:
      checking if the frame buffers contain any reference frames needed to decode the next frame;
      decoding a next frame using all reference frames needed to decode the next frame which can be found in the frame buffer;
      replacing data in a frame buffer with the next frame, wherein the data replaced in the frame buffer comprises data having a lowest cost of restoration, where determining the lowest cost of restoration comprises at least determining that the frame requires a lowest number of additional video frames to decode; and
   wherein the displaying, determining, inspecting, designating, checking and decoding are carried out within the frame period for displaying the current frame.

15. The method according to claim 14, wherein the data replaced comprises data that can be restored by reading from a storage device.

16. The method according to claim 14, wherein the data replaced comprises an oldest frame stored in any of the frame buffers.

17. The method according to claim 14, wherein the data replaced comprises a frame that has just been used and is not referenced by another frame.

18. The method according to claim 14, wherein the data replaced comprises data that has the lowest cost in time to restore.

19. The method according to claim 14, wherein the data replaced comprises data that has the lowest cost in computational complexity to restore.

20. The method according to claim 14, wherein the data replaced comprises an intra-coded frame.

21. The method according to claim 14, wherein the frames stored in the frame buffers are stored during a normal play mode.

22. The method according to claim 14, wherein the frames stored in the frame buffers are stored after invoking the trick play mode.

23. The method according to claim 22, wherein the frames stored in the frame buffers are stored at a rate of greater than the frame rate.

24. A system for carrying out trick mode play for digital video, comprising:
a plurality of frame buffers storing a corresponding plurality of most recent reference frames;
a memory;
a decoder;
a means for displaying a current frame during a current frame time interval;
a programmed processor operating by use of a computer program stored in the memory to carry out the process of:
determining a next frame for display;
inspecting the plurality of frame buffers to determine if the next frame is present in one of the frame buffers;
if the next frame is present in one of the frame buffers, designating the frame for display in the next frame time interval;
if the next frame is not present in one of the frame buffers:
checking if the frame buffers contain any reference frames needed to decode the next frame; and
instructing the decoder to decode a next frame using all reference frames needed to decode the next frame which can be found in the frame; and
storing data comprising a next frame into one of the frame buffers by replacing said frame buffer data with data selected for replacement being based upon the replaced data having a lowest cost of restoration, where determining the lowest cost of restoration comprises at least determining that the frame requires a lowest number of additional video frames to decode.

25. The system according to claim 24, wherein the data replaced comprises data that can be restored by reading from a storage device.

26. The system according to claim 24, wherein the data replaced comprises an oldest frame stored in any of the frame buffers.

27. The system according to claim 24, wherein the data replaced comprises a frame that has just been used and is not referenced by another frame.

28. The system according to claim 24, wherein the data replaced comprises data that has the lowest cost in time to restore.

29. The system according to claim 24, wherein the data replaced comprises data that has the lowest cost in computational complexity to restore.

30. The system according to claim 24, wherein the data replaced comprises an intra-coded frame.

31. The system according to claim 24, wherein the frames stored in the frame buffers are stored during a normal play mode.

32. The system according to claim 24, wherein the frames stored in the frame buffers are stored after invoking the trick play mode.

33. The system according to claim 24, wherein the frames stored in the frame buffers are stored at a rate of greater than the frame rate.

34. The system according to claim 33, wherein the plurality of frame buffers comprises at least five frame buffers.

35. The system according to claim 24, wherein the displaying, determining, inspecting, designating, checking and decoding are carried out within the frame period for displaying the current frame.

36. The system according to claim 24, further comprising a storage device that stores the digital video.

37. The system according to claim 24, wherein the storage device comprises a disc drive.

38. The system according to claim 24, embodied within a personal video recorder.

39. The system according to claim 24, wherein the frame buffer selected for storage of a decoded frame is selected under control of the programmed processor.

40. The system according to claim 24, wherein the frame buffer selected for storage of a decoded frame is selected under control of the programmed processor for both forward and reverse play.

41. The system according to claim 24, wherein the programmed processor determines if a frame of video should be displayed after decoding.

42. The system according to claim 24, wherein the programmed processor determines how long a frame of video is displayed.

43. The system according to claim 24, wherein if the decoder is fed unnecessary frames for processing, the programmed processor can instruct the decoder to skip decoding the unnecessary frames.

* * * * *